(12) United States Patent
Masuda et al.

(10) Patent No.: US 7,369,282 B2
(45) Date of Patent: May 6, 2008

(54) DOCUMENT READING DEVICE

(75) Inventors: Makoto Masuda, Nara (JP); Yasuhiro Ono, Kyoto (JP); Hisashi Yamanaka, Yamatokoriyama (JP); Tetsushi Ito, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1041 days.

(21) Appl. No.: 10/621,609

(22) Filed: Jul. 18, 2003

(65) Prior Publication Data

US 2004/0027621 A1 Feb. 12, 2004

(30) Foreign Application Priority Data

Jul. 19, 2002 (JP) ............... 2002-211022

(51) Int. Cl.
H04N 1/04 (2006.01)
H04N 1/40 (2006.01)
H04N 1/38 (2006.01)

(52) U.S. Cl. .............. 358/486; 358/461; 358/463; 358/496

(58) Field of Classification Search ........... 358/486, 358/461, 463, 496, 488, 475; 382/108
See application file for complete search history.

(56) References Cited

U.S. PATENT DOCUMENTS 6,563,938 B1 * 5/2003 Harada ................ 382/108
6,750,990 B1 * 6/2004 Ohashi ................ 358/496
2002/0176634 A1 * 11/2002 Ohashi ................ 382/275

FOREIGN PATENT DOCUMENTS

JP 2000-261625 A 9/2000

* cited by examiner

Primary Examiner—Houshang Safaipour
(74) Attorney, Agent, or Firm—Birch, Stewart, Kolasch & Birch, LLP

(57) ABSTRACT

A document reading device includes a document transport and, for reading a document image, an optical reader having a movable exposure which stops at a predetermined reading position and emits light onto the document. A guide member guides the document to the reading position to form a predetermined inclination angle with respect to a flat-plate face of a support, which supports the document being transported when it passes over the reading position. A transport path is formed with the support so that the document passing over the reading position is transported along the flat-plate face. A detection member detects a leading end position of the guide member, the predetermined reading position being set to within a predetermined distance in a transport direction from the leading end of the guide member, which is known beforehand to be stain-free.

10 Claims, 8 Drawing Sheets

FIG. 3 (a)

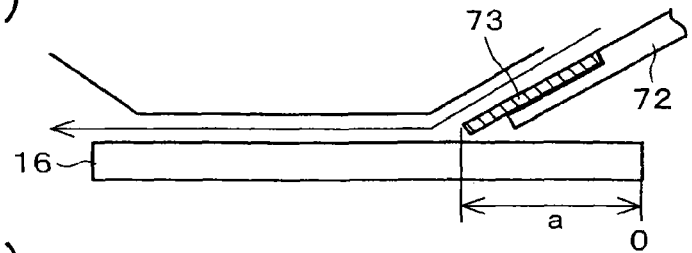

FIG. 3 (b)

A4 JAPANESE 80g PAPER
CHANGES IN STAIN FIRST APPEARANCE POSITION
WITH CHANGES IN GUIDE MEMBER POSITION

FREQUENCY IN STAIN APPEARING ON SECOND CONTACT GLASS

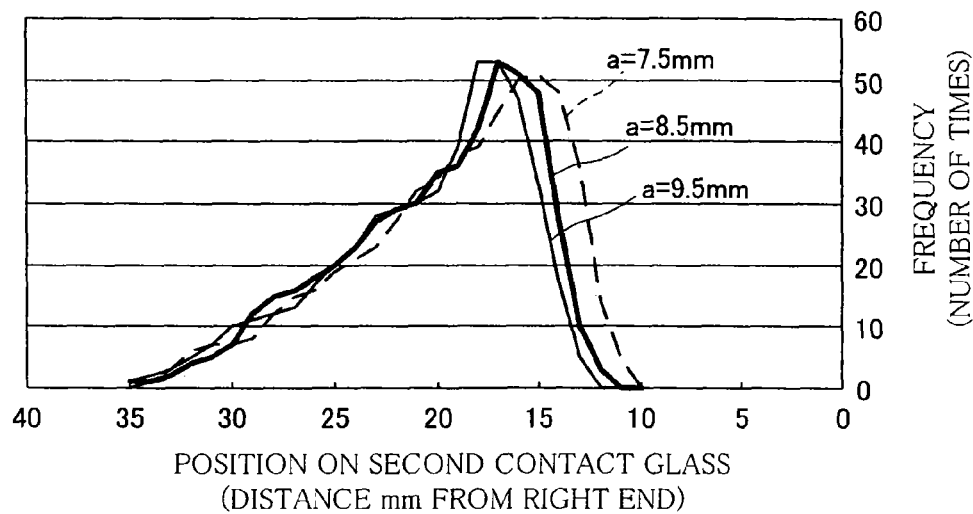

POSITION ON SECOND CONTACT GLASS
(DISTANCE mm FROM RIGHT END)

FIG. 3 (c)

DIFFERENCE IN STAIN APPEARANCE FREQUENCY
WITH CHANGES IN WEIGHT·KIND OF DOCUMENT

FREQUENCY (a = 7.5) IN STAIN APPEARING
ON SECOND CONTACT GLASS

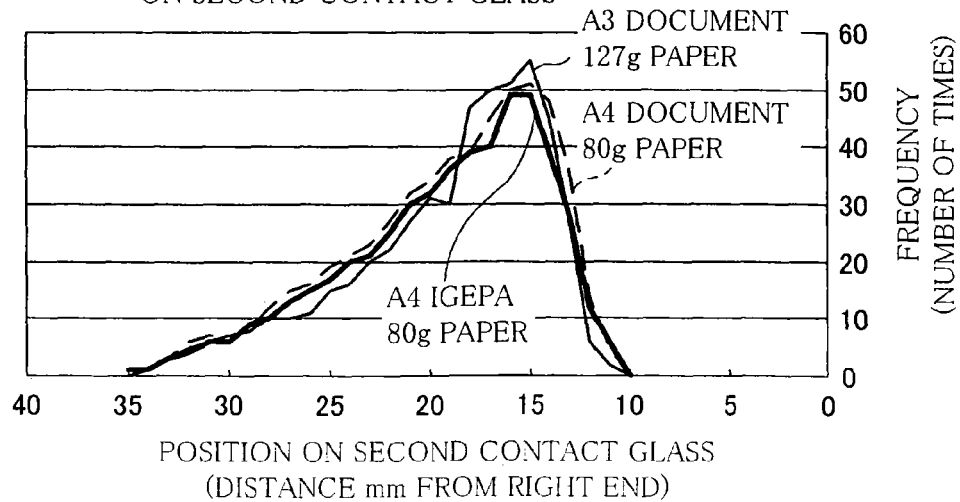

POSITION ON SECOND CONTACT GLASS
(DISTANCE mm FROM RIGHT END)

DOCUMENT READING DEVICE

The present application claims priority under 35 U.S.C. §119 to Japanese Patent Application No. 2002-211022, filed Jul. 19, 2002, the entire disclosure of which is hereby incorporated by reference.

BACKGROUND OF THE INVENTION

1. Field of the Invention

The present invention relates to a document reading device for reading an image of a document while transporting the document.

1. Description of Related Art

In recent years, a document reading device, which automatically transports a sheet document inside the device and reads an image of the document at a predetermined position, is typically mounted to an image forming device and other devices. With such a document reading device, the image forming device becomes capable of performing image reading and image forming operations in efficient manner. Further, with advanced digital technology, such processes as reading document, converting an image data into electronic data, forming an image from the electronic data, etc., can be performed at higher speed, and the document reading device becomes capable of processing a greater number of sheets of document at once, so as to perform reading processing of more sheets of document at a high speed. In addition, enhanced reading performance and improved document transport technology allow the document reading devices to read various kinds of documents.

As one example of the above document reading device, Japanese Unexamined Patent Publication No. 2000-261625 (Tokukai 2000-261625; published on Sep. 22, 2000) discloses a document reading device for reading an image of a document while transporting the document, wherein the position of an exposure member for use in reading a document image by optical reading means is adjusted according to a thickness of a sheet document, so as to read the document image at the position where the document contacts a document platen.

Incidentally, in the case of reading an image of a document while transporting the document as described above, the document reading device reads an image of a document in the state where the exposure member stops at a determined position, i.e., with the optical reading means at a stop. Therefore, the document reading device generally has transparent support means (known as platen glass, contact glass, or the like), provided between the document and the exposure member, which serves as a reference in keeping a distance between the document and the exposure member constant.

With a greater variation in kinds of documents that can be processed by the document reading device, and improved reading performances, it becomes general to process documents written in a ballpoint pen, a pencil, or documents corrected in white-out by the document reading device. Therefore, the document reading device for reading an image of a document while transporting the document often faces the problem that the support means is stained with rubbed ink, powders of a pencil lead, white-out not completely hardened, and others, when the document is being transported over the support means, which adversely affects the reading operation by the optical reading means, resulting in lower quality of the read image. Furthermore, since the optical reading means and the support means do not move, if such stains appear in a read area of the support means where reading is carried out by the optical reading means, the problem of missing some part of read data and black lines would occur for each document, resulting in a significant deterioration in quality of the read image.

Further, with a certain distance above the support means provided is a transport path forming member which forms a document transport path with the support means in the vicinity of a reading position. This transport path forming member guides a document passing over the reading position to be transported along a flat-plate face of the support means, to regulate movement of the document in the direction orthogonal to the flat-plate face of the support means. The transport path forming member also serves as a background member for returning the reflected light to the optical reading means in an area where the document is not present. In response to the above problem of stains appeared on the support means, it may be arranged so as to increase the distance between the support means and the transport path forming member to 1.0 mm to 1.5 mm to resist rubbing of a document against the support means. However, even although the optical reading means, which is a reduced optical system, have a great depth of focus, the document reading device in which the distance between the support means and the transport path forming member is increased to 1.0 mm to 1.5 mm tends to cause more deterioration in read image quality due to insufficient area of the focus position, compared with the document reading device in which the above distance is set with a range of 0.5 mm and 1.0 mm.

SUMMARY OF THE INVENTION

An object of the present invention is to provide a document reading device which can read an image of a document being transported without being affected by stains on support means, with optical reading means at a stop, while the distance between the support means of a document and a transport path forming member in the vicinity of a reading position in a preferable range of 0.5 mm to 1.0 mm.

In order to achieve the above object, a document reading device of the present invention includes:

document transport means for transporting a document;

optical reading means for reading a document image, the optical reading means being provided with a movable exposure member which stops at a predetermined reading position and emits light onto the document;

support means for supporting the document being transported by the document transport means when the document passes over the reading position;

a guide member which serves as a guide face for guiding the document to the reading position so as to form a predetermined inclination angle with respect to a flat-plate face of the support means;

a transport path forming member for forming a transport path with the support means so that the document which passes over the reading position can be transported along the flat-plate face of the support means; and detection means for detecting a leading end position of the guide member, wherein the predetermined reading position is set within a range of predetermined distance in a transport direction from the leading end of the guide member as detected by the detection means, which is known beforehand to be free from stains on the support member caused by a contact with the document.

According to the above invention, the guide member, which serves as a guide face, of the document transport means guides the document to the reading position between the support means and the transport path forming member so as to form a predetermined inclination angle with respect to the flat-plate face of the support means. Further, a predetermined range of distance in a transport direction of the document from the leading end of the guide member is free from the stains on the support means caused by a contact with the document appear. Therefore, unlike the conventional structure, it is not necessary to increase a distance between the support means and the transport path forming member to prevent the support means from being stained.

As a result, it becomes possible to provide a document reading device which can read an image of a document being transported without being affected by stains on support means, with optical reading means at a stop, while the distance between the support means of a document and a transport path forming member in the vicinity of a reading position in a preferable range of 0.5 mm to 1.0 mm.

Further, the leading end position of the guide member is detected by the detection means, and a position spaced at a predetermined distance, which is within the predetermined range of distance, from a position facing the leading end position is set as the predetermined position, and the exposure member is moved to the predetermined position as set. Therefore, despite variations in installation position of the guide member for respective devices, it is possible to recognize the position free from the stains of the support means for each device. Further, the leading end position of the guide member of the same device may change. However, with the foregoing structure, it is possible to check and confirm the correct position free from the stains of the support means.

For a fuller understanding of the nature and advantages of the invention, reference should be made to the ensuing detailed description taken in conjunction with the accompanying drawings.

BRIEF DESCRIPTION OF THE DRAWINGS

FIGS. 3(a) through 3(c) are relation comparative diagrams showing a relation between a leading end position of a guide member and a position of stains appearing on a second contact glass.

DESCRIPTION OF THE EMBODIMENTS

Referring to FIGS. 1 through 8, the following will describe one embodiment of the present invention.

Figure 1:
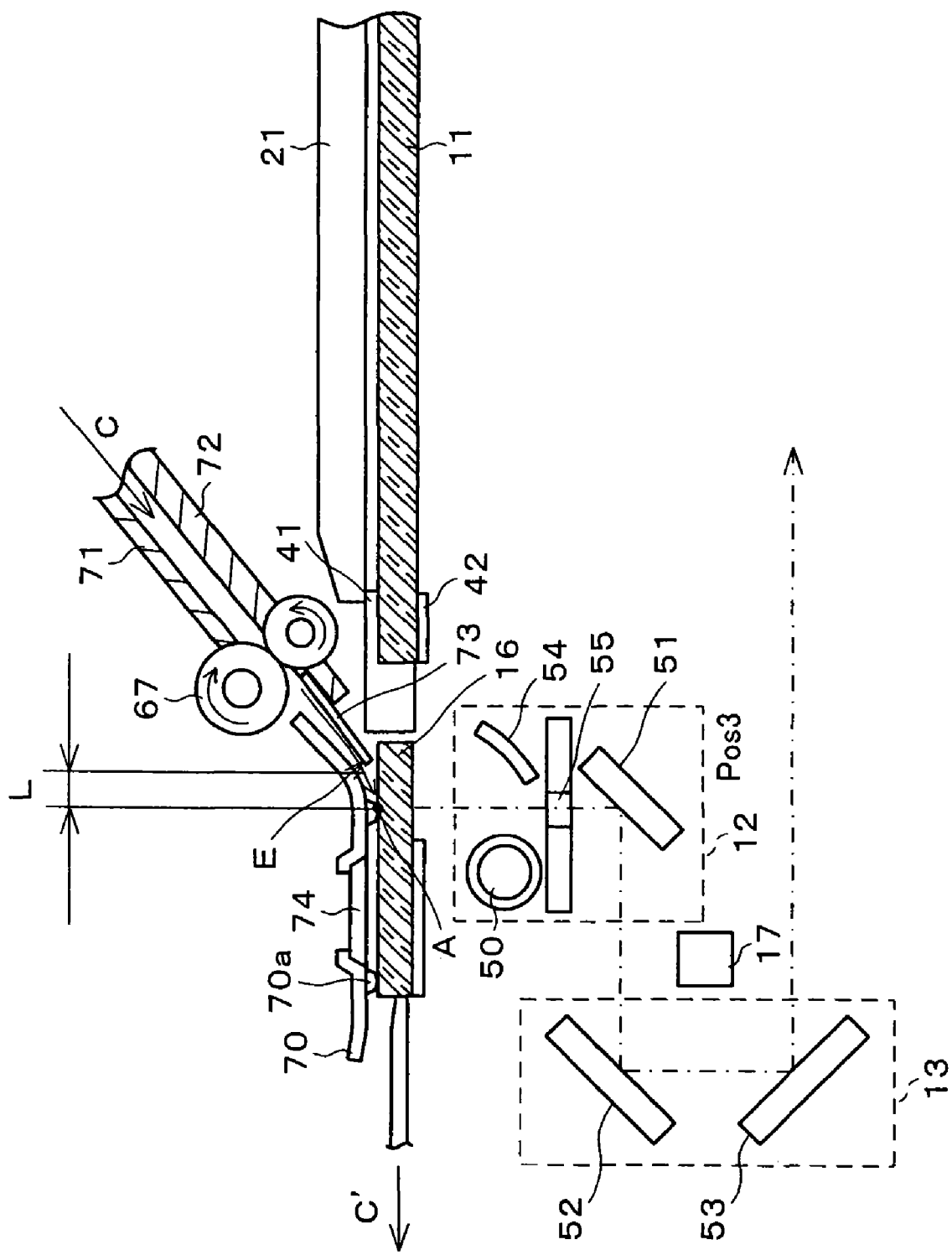
FIG. 1 is a schematic cross-sectional view showing the structure around a reading position of a document reading device in a scanning reading mode according to one embodiment of the present invention.
Figure 2:
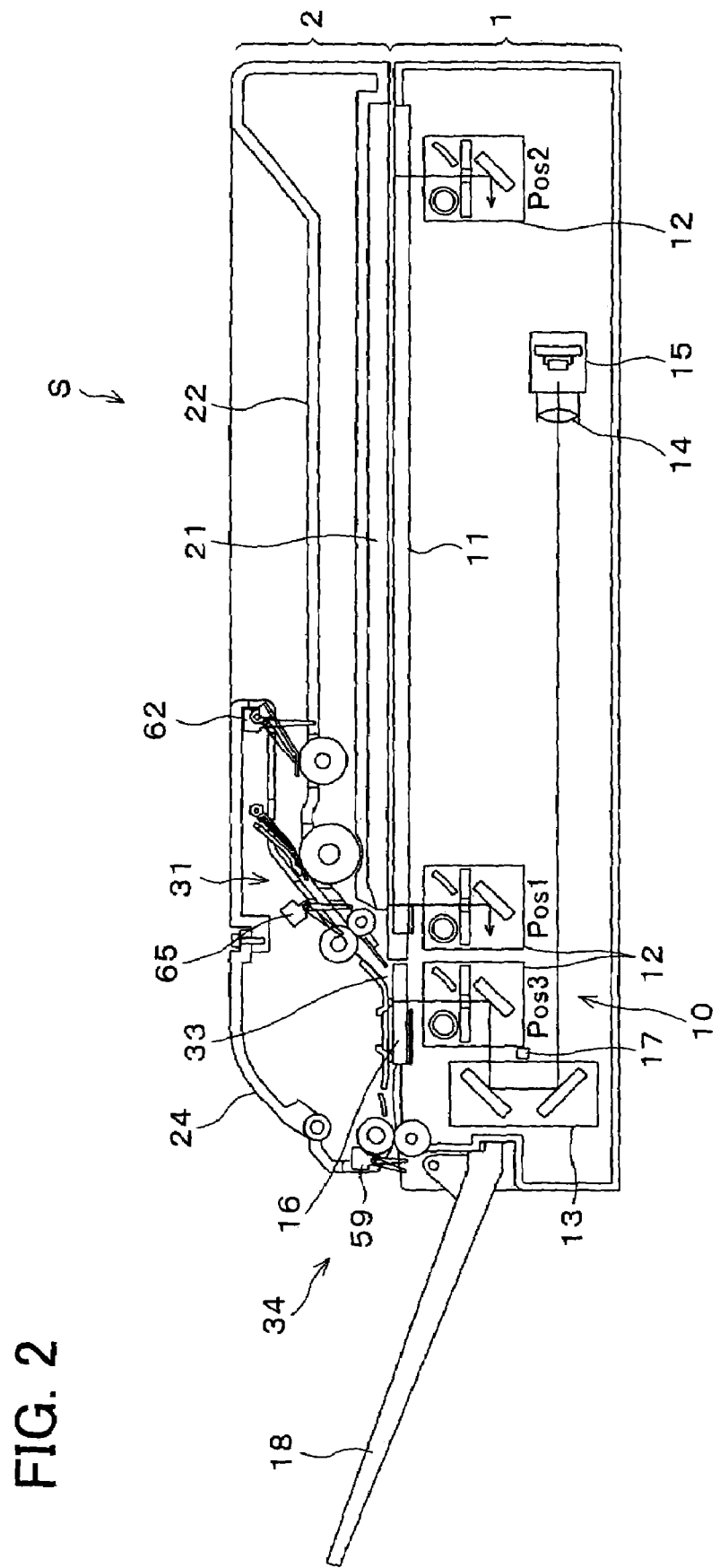
FIG. 2 is a schematic cross-sectional view showing the structure of a document reading device according to one embodiment of the present invention.

FIGS. 1 and 2 are explanatory diagrams showing the structure of a document reading device S according to the present embodiment. As shown in FIG. 2, the document reading device S is provided with a lower cabinet 1 and an upper cabinet 2.

Available modes in the document reading device S are a static reading mode in which a document image is read from a stationary document and a scanning reading mode in which a document image is read from the document being transported. A selection of these modes is carried out from an operation section (the operation section is composed of, for example, a display section of a liquid crystal display, setting keys, and other members) provided in an image output device.

In the static reading mode, a document image is read by scanning the document while moving a later-described first scanning unit 12 provided inside a lower cabinet 1. On the other hand, in the scanning reading mode, a document image is read by scanning the document in a state where the first scanning unit 12 is stopped at a predetermined position.

The lower cabinet (second cabinet) 1 includes a first contact glass 11, the first scanning unit 12, a second scanning unit 13, an image focus lens 14, a CCD (Charge Coupled Device) 15, a second contact glass 16, a first scanning unit detector 17, and a document discharge tray 18. Further, the first scanning unit 12, the second scanning unit 13, the image focus lens 14, the CCD 15, and the first scanning unit detector 17 constitute a reading section (optical reading means) 10.

The first contact glass (document platen) 11 is a platen for placing thereon a document from which an image is to be read in the static reading mode. The first scanning unit (exposure member) 12 exposes a document and guides a reflected light from the document to an optical system following the first scanning unit 12, while moving from left to right in FIG. 2 at a predetermined speed V under the first contact glass 11. As shown in FIG. 1, the first scanning unit 12 includes a light source 50 as an exposure lamp emitting light onto a document, a first reflection mirror 51 for guiding reflected light from a document to the second scanning unit 13, a reflector 54 for reflecting a portion of the light emitted from the light source 50 to the document, and a slit 55 for limiting the amount of reflected beams from the document.

The second scanning unit 13 is arranged so as to move at a speed of V/2, following the first scanning unit 12, and includes, as shown in FIG. 1, a second reflection mirror 52 and a third reflection mirror 53 for guiding light from the first reflection mirror 51 to the image focus lens 14 and the CCD 15. The image focus lens 14 focuses reflected light from the third reflection mirror 53 onto the CCD 15. The CCD 15 is a device for converting light from the image focus lens 14 into analog electrical signals. Note that, the electrical signals are converted into digital image data by an image processing section to be stored in image memory and to be outputted to a device such as image forming device and external device. In such a manner, the reading section 10 reads a document image by sequentially detecting reflected light from the document.

Note that, the reading section 10 is provided with a driving section 81 (see FIG. 4) for activating the first scanning unit 12 and the second scanning unit 13. The driving section 81 includes a wire (not shown) which is winded around the first scanning unit 12 and the second scanning unit 13 to cause them to move simultaneously. The driving section 81 also includes a stepping motor (not shown) for activating the first scanning unit 12 and the second scanning unit 13 through the wire. Additionally, the reading section 10 includes a document size detector 82 for detecting a document size (see FIG. 4).

As described above, the reading section 10 reads an image of a document placed on the first contact glass 11 in the static reading mode, and in the scanning reading mode, reads through the second contact lens 16 the image of the document being transported by members in the upper cabinet 2. The second contact glass (support means) 16 is provided in a flat-plate manner so as to be placed between the first scanning unit 12 and a reading position A (see FIG. 1), to support a document passing over the reading position A in the scanning reading mode. The second contact glass 16 allows the light from the first scanning unit 12 and reflected light from the passing the reading position A to pass therethrough.

Further, when a document on the first contact glass 11 is read (in the static reading mode), the first scanning unit 12 moves a predetermined distance in accordance with a document size detected by the document size detector 82 in the direction heading from Pos1 that is a starting position of document scanning to Pos2 that is an end position of document scanning. On the other hand, when a transported document is read (in the scanning reading mode), the first scanning unit 12 stops at Pos3 provided on the left side of Pos1 (on the side of the second contact glass 16) in FIG. 2. During standby, the first scanning unit 12 moves to Pos1, Pos3, or other position in accordance with a position of the first scanning unit 12, which is detected by the first scanning unit detector 17, and stops at the position as a home position.

As shown in FIG. 1, on the front side of the end part of the first contact glass 11 provided is a reference platen 41 for stopping document.

The reference platen 41 indicates marks for showing sizes and setting directions of a document to be set on the first contact glass 11. Therefore, users can easily set a document on the first contact glass 11 according to these marks.

Further, on the other surface of the first contact glass 11, which is a surface where the reference platen 41 is not provided, and at a place opposite to the reference platen 41, a first reference white board 42 for use in shading of the CCD 15 (determination of white level) is provided. Note that, the first reference white board 42 may be provided on the lower side of the reference platen 41 and on the upper side of the contact glass 11.

Moreover, the upper cabinet (first cabinet) 2 shown in FIG. 2 is arranged so as to move upwards on a hinge (not shown) provided between the upper cabinet 2 and the lower cabinet 1 at the back of the document reading device S (at the back of the drawing). This allows the document reading device S to open upper surfaces of the first contact glass 11 and the second contact glass 16 from the front side of the drawing). The upper cabinet 2, as shown in FIG. 2, includes an OC mat 21, a document set tray 22, and an open door 24.

The OC mat 21 is a mat for holding a document, provided in a position so as to be pressed to and closely contact with the first contact glass 11 when the upper cabinet 2 is closed. The document set tray 22 is a stage for setting a document to be read in the scanning reading mode. The open door 24 is a window, which is freely open and close, is mounted to the upper cabinet 2, for mounting a second reading section (not shown) thereon to adjust a position in upgrading the document reading device S to a double-side simultaneous document reading device.

Also, the upper cabinet 2 includes a document transport driving section 31, a document transport guiding section 33, and a document discharge section 34, which are provided to transport a document set on the document set tray 22 to the reading position A. The document transport driving section 31, document transport guiding section 33, and document discharge section 34 constitutes document transport means. The document transport driving section 31 delivers a document set on the document set tray 22 thereinto and transports it through a transport path. The document transport driving section 31, including various rollers for document transport, especially includes paired adjustment rollers 67 for adjusting a document transported from the direction indicated by C in FIG. 1 to provide the timing of reading. Also, the document transport driving section 31 includes a document detector 62 for detecting a document delivered from the document set tray 22 and a feed timing sensor 65 for detecting a document before the paired adjustment rollers 67 so as to provide the timing at which the paired adjustment rollers 67 feed the document to the reading position A.

Further, the document transport guiding section 33 provides a document transport path. The document transport guiding section 33, as shown in FIG. 1, includes a first document transport guide 71 and a second document transport guide 72 for providing a transport path extending from a paper feed port of the document set tray 22 to the paired adjustment rollers 67. Further, at the leading end in the transport direction of the second document transport guide 72 provided is a guide member 73 which is a guide face for guiding a document at a predetermined inclination angle from the pared adjustment rollers 67 to the second contact glass 16. The guide member 73, a different member from the second contact glass 16, is made of flexible material including film and sheet such as Mylar® and attached with a double face adhesive tape or the like to the leading end of the second document transport guide 72. Here, a black Mylar® is used for the guide member 73.

Note that, although the guide member 73 could be formed by expanding the second document transport guide 72, it is preferable that the guide member 73 is separated from the second document transport guide 72 and is made of flexible material, to avoid the damage of the second contact glass 16 from crushing of the edge of the upper cabinet 2 to the second contact glass 16 in some action including close action of the upper cabinet 2 and to reduce transport resistance of a document to the guide member 73 for smooth transporting of a document. The aforementioned reading position A is at a position spaced distance L from the position opposite to the leading end of the guide member 73 on the second contact glass 16 in the transport direction substantially along a flat-plate face of the second contact glass 16.

Further, the document transport guiding section 33 includes an upper document transport guide (transport path forming member) 70. The upper document transport guide 70 is a guide for restricting the position of a transported document on the second contact glass 16, provided so as to sandwich the reading position A with the second contact glass 16. Also, the upper document transport guide 70 and the second contact glass 16 provide a transport path so that the document which passes over the reading position A can be transported in the direction indicated by C' in FIG. 1 along the flat-plate face of the second contact glass 16. The upper document transport guide 70 is arranged so that a parallel part of the upper document transport guide 70 to the second contact glass 16 is spaced 0.5 mm to 1 mm, preferably 0.5 mm to 0.7 mm away from the second contact glass 16 by a positioning protrusion 70a. Also, to the upper document transport guide 70 provided is an opening section 74 for mounting the aforementioned second reading section, in a shut state.

The document discharge section 34 discharges a document after its image is read to the document discharge tray 18. The document discharge section 34 includes rollers for document discharge and a discharged sheet detector 59 for detecting a discharged document, as shown in FIG. 2.

Figure 4:
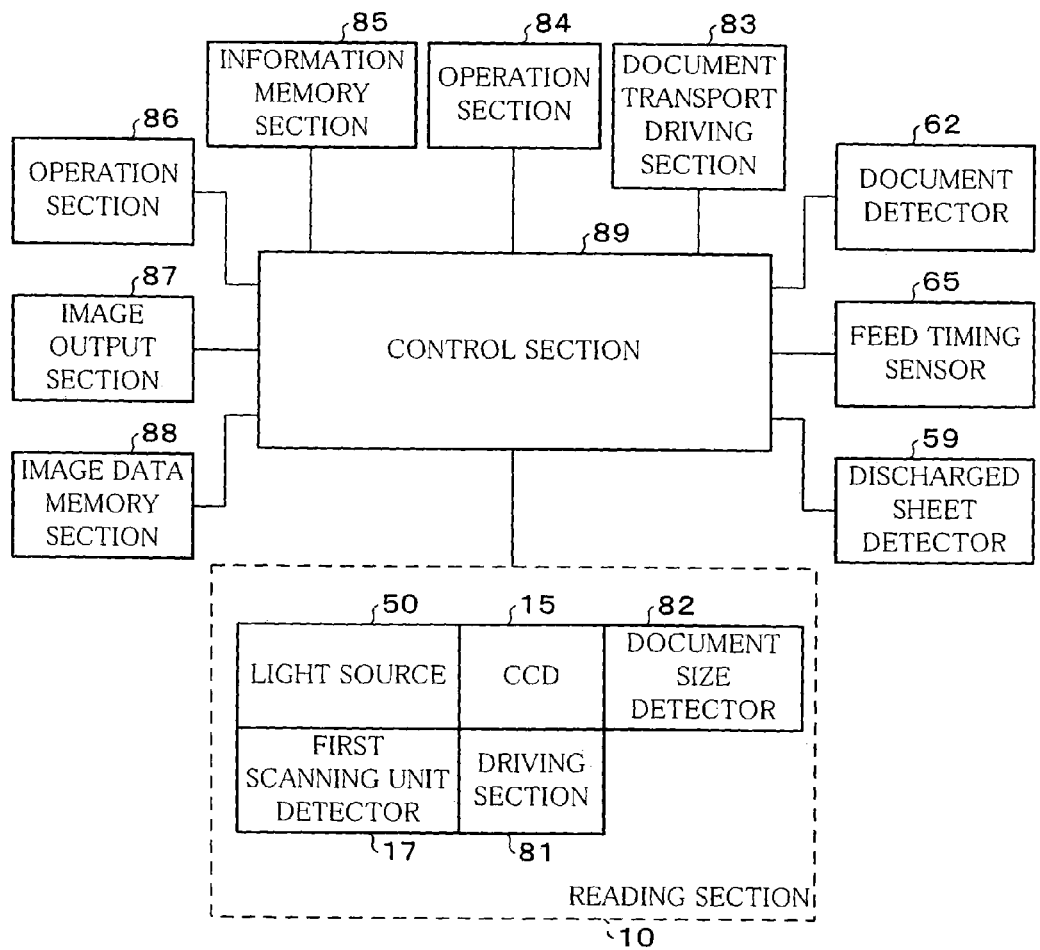
FIG. 4 is a block diagram showing a structure of a control system in the document reading device shown in FIG. 2.

FIG. 4 is a block diagram showing a structure of a control system of the above-arranged document reading device S. A document transport driving section 83 activates rollers for use in document transport and discharge in the document reading device S. An operation section 84 is an operation panel for carrying out various settings on the document reading device S. An information memory section 85 stores information on the operation of the document reading device S therein. An operation section 86 is an operation panel for carrying out various settings on image output. An image output section 87 outputs an image read from a document in a predetermined form including toner image. An image data memory section 88 stores image data read from a document therein. Other members in FIG. 4 carry out the operations as mentioned previously. A control section 89 controls the operations of the members.

Next, the following will describe a set value for the distance L in FIG. 1 in the above-arranged document reading device S.

As shown in FIG. 3(a), distance a indicates a distance between an original point O that is an end part of the second contact glass 16 on the side of the first contact glass 11 (right end part in FIG. 3(a)) and the position opposite to the leading end of the guide member 73 on the second contact glass 16. When a document is read by the reading section 10 in the scanning reading mode, its read surface faces the second contact glass 16. FIG. 3(b) shows a result of determining how an area of stains caused by a contact with the document on the second contact glass 16 changes with changes in distance a. FIG. 3(b) illustrates frequency in stain appearing at a position some distance measured from the original point O in the transport direction on the second contact glass 16, in the case when the distance a is 7.5 mm, 8.5 mm, and 9.5 mm, using A4 Japanese 80 g/m² (JIS (Japanese Industrial Standards) A4 80 g/m²) paper. The inclination angle of the guide member 73 constantly maintains a predetermined value (e.g. 15°) in all of the three cases. In the case of a=7.5 mm, stains begin to appear at a distance of 10 mm from the original point O. Thereafter, frequency in stain appearing reaches a maximum point, and then it gradually decreases. In the case of a=8.5 mm, stains begin to appear at a distance of 11 mm from the original point O. Thereafter, frequency in stain appearing reaches a maximum point, and then it gradually decreases. In the case of a=9.5 mm, stains begin to appear at a distance of 12 mm from the original point O. Thereafter, frequency in stain appearing reaches a maximum point and then, it gradually decreases.

Next, FIG. 3(c) illustrates a result of determining how an area of stains appearing on the second contact glass 16 changes with changes in weight and kind of document when the distance a is fixed to 7.5 mm. FIG. 3(c) shows results on the cases of A4 Japanese 80 g/m² paper, A3 Japanese 127 g/m² (JIS (Japanese Industrial Standards) A3 127 g/m²) paper, and A4 Igepa 80 g/m² (manufactured by Igepa; DIN (Deutsche Industrie-Norm) A4 80 g/m²) paper. In all of the cases, stains begin to appear at a distance of 10 mm from the original point O. Thereafter, frequency in stains appearing reaches a maximum point, and it gradually decreases.

Figure 5:
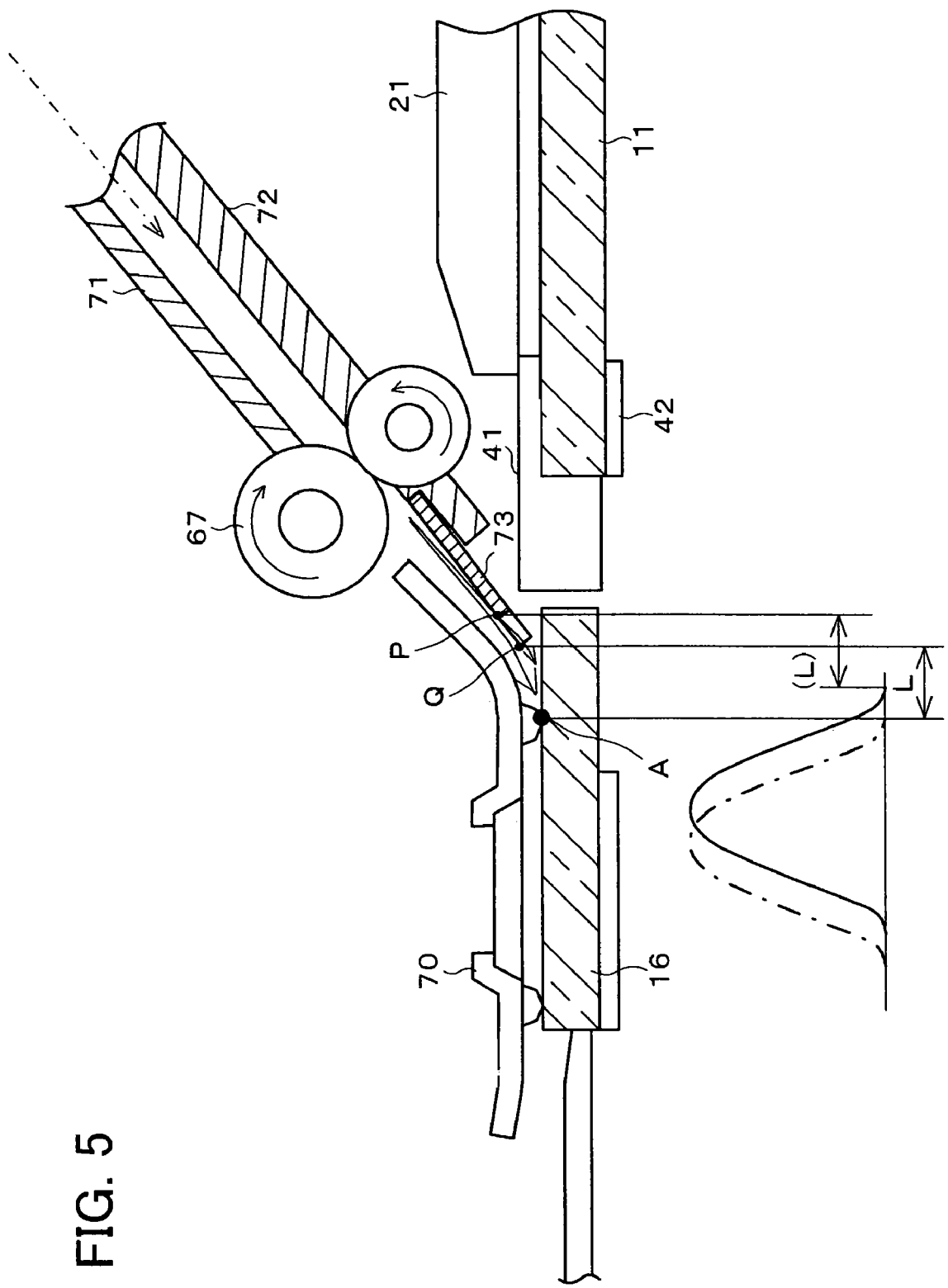
FIG. 5 is a cross-sectional view illustrating a stop position of a first scanning unit in the document reading device shown in FIG. 2.

FIGS. 3(b) and 3(c) indicate that regardless of weight and kind of document, stains begin to appear at a distance shifted by 2.5 mm from a position opposite to the leading end of the guide member 73 in the transport direction. In view of this result, the present embodiment determines to stop the first scanning unit 12 of the reading section 10 at such a position that it is possible to read through an area of no stains appearing on the second contact glass 16, which was found as described above. Specifically, as shown in FIG. 5, the aforementioned Pos3 (FIG. 1) is set at such a predetermined position that the light to a document and reflected light from a passing part of document passing over the reading position pass through the second contact glass 16 within a range of the distance L (e.g. 2.5 mm as described previously) at which no stains appear from the position opposite to point P that is a leading end position of the guide member 73. If the leading end position of the guide member 73 changes to point Q, Pos3 is set at such a predetermined position that the light and reflected light pass through the second contact glass 16 within a range of the distance L (e.g. 2.5 mm as described previously) at which no stains appear from the position opposite to the point Q. The reading position A is determined in accordance with the Pos3's position thus set. This provides Pos3 with an optimal reading position, allowing a document to be read all the time in an area where frequency in stains is zero as shown in FIG. 4.

Unlike the conventional manner, since the first scanning unit 12 stops at such Pos3 to read a document, it is not necessary to increase a distance between the second contact glass 16 and the upper document transport guide 70 so as to prevent the second contact glass 16 from being stained. As a result of this, the document reading device S can read an image of a transported document without being affected by stains on the second contact glass 16, in the state where the reading section 10 is stopping, keeping a preferable range of 0.5 mm to 1.0 mm of the distance between the second contact glass 16 and the upper document transport guide 70.

Thus, data on unstained area, which were obtained by the experiments of gathering data on frequency in stains appearing on the second contact glass 16, are stored in the information memory section 85 in FIG. 4. This data includes at least data on how distant a position of Pos3 should be set from the leading end position of the guide member 73. Further, the document reading device S is arranged so as to set a position of Pos3 from a result of detecting the leading end position of the guide member 73 by the reading section 10. Then, in the scanning reading mode, the first scanning unit 12 of the reading section 10 is caused to move to Pos3. In addition, Pos3 is defined to be a home position of the first scanning unit 12 in the scanning reading mode. Movement to Pos3 is realized by the use of the first scanning unit detector 17. Since the first scanning unit detector 17 detects a position of the first scanning unit 12, how much the first scanning unit 12 should be moved can be found by this detection result, the detected leading end position of the guide member 73, and information on Pos3 stored in the information memory section 85. The optimal position of Pos3 thus found is stored in the information memory section 85 and updated every time the leading end position of the guide member 73 is detected.

Therefore, even when an installation position of the guide member 73 varies depending on devices, it is possible to recognize a position where the second contact glass 16 is not stained for each device. Additionally, even when the leading end position of the guide member 73 changes in one device, it is possible to start again finding a position where the second contact glass 16 is not stained.

Further, the guide member 73 differs from the surrounding members in that its color is set to black as described above. Thus, reading the color of the leading end of the guide member 73 and detecting the leading end position of the guide member 73 are possible in such a manner that at least the leading end of the guide member 73 has a color that is readable by scanning exposure of the first scanning unit 12. Therefore, since the reading section 10 can be used to detect the leading end position, it is not necessary to provide additional detection means.

The following description will be given based on the document reading operation of the document reading device S in which Pos3 is determined as described above.

In the static reading mode, only a single side mode is selectable, and reading is carried out in such a manner that the first scanning unit 12 of the reading section 10 scans a stationary document. At this moment, the first scanning unit 12 is placed at the home position (between Pos3 and Pos1 in FIG. 2) in the static reading mode. According to an instruction from the control section 89 in FIG. 4, the first scanning unit 12 moves from Pos1 in the direction of Pos2 with the second scanning unit 13 while scanning a document set on the first contact glass 11. This allows the CCD 15 to receive reflected light in accordance with a document image. In such a manner, the reading section 10 reads an image on a lower surface (front face) of the stationary document.

On the other hand, in the scanning reading mode, reading of a document image is carried out transporting a document under a state in which the reading section is stopped at Pos3. In response to an instruction of this mode, the first scanning unit 12 of the reading section 10 moves from the home position in the static reading mode, if it is at the position, to Pos3 that is a home position in the scanning reading mode and maintains a stopping state to read a running document. Then, according to an instruction from the control section 89 in FIG. 4, the CCD 15 reads an image of a document transported through the transport path below the second contact glass 16. That is, the reading section 10 reads an image on a lower surface (front face) of the document.

In the present embodiment, the position of Pos 3 fount as described previously is a home position in the scanning reading mode. Therefore, when the scanning reading mode, which is often used to increase efficiency in reading, is started, it does not take time for the first scanning unit 12 to move to an optimal reading position because the first scanning unit 12 is at the position from the start. In addition, it does not take time even when the leading end of the guide member 73 is newly detected and the first scanning unit 12 moves to a newly set Pos3 because the first scanning unit 12 is near the newly set Pos3. This makes it possible to shorten movement time of the first scanning unit 12.

In the present embodiment, the leading end position of the guide member 73 is detected to set the position of Pos3 at a predetermined timing that it is judged that the leading end position of the guide member 73 could have been changed from a position detected last time. With this arrangement, even when the leading end position of the guide member 73 is changed from a position at the last time detection, the leading end position is detected at a predetermined timing that it is judged that the position could have been changed, and the position of Pos3 can be set before the starting of next document reading. This allows Pos3 to be a position in accordance with a leading end position of the guide member 73 for the next document reading. Therefore, it is possible to surely perform a reading operation at a position free from stains caused by a contact with a document.

Figure 6:
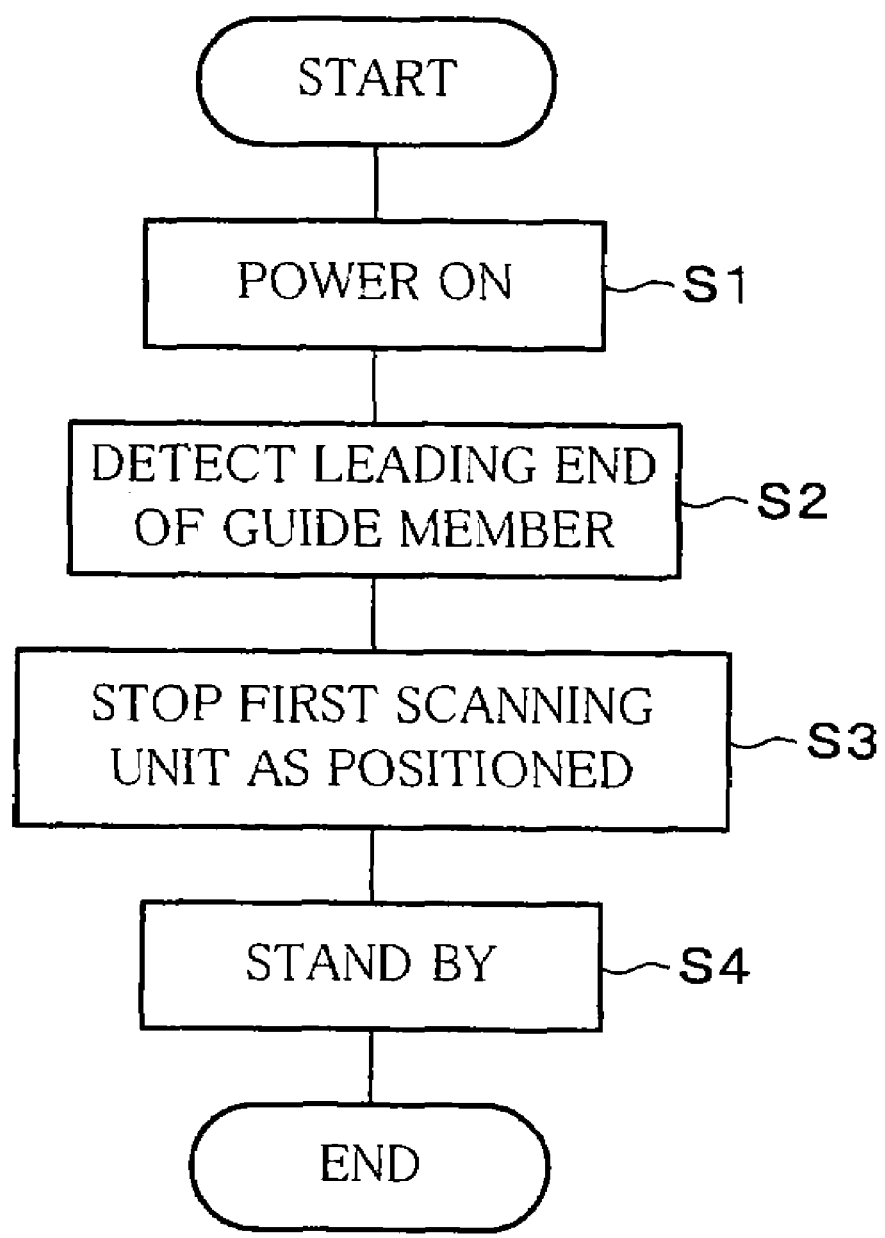
FIG. 6 is a flow chart showing one example of steps for positioning the first scanning unit using the document reading device shown in FIG. 2.

In one example, the leading end position of the guide member 73 is detected at a preparatory operation stage just after the power of the document reading device S is turned ON. A flow in this case is shown in FIG. 6. At the step S1 when the power of the document reading device S is turned ON, the leading end position of the guide member 73 is detected at the step S2. Then, at the step S3 the first scanning unit 12 is caused to position and stop at the position of Pos3. At the step S4, the first scanning unit 12 stands by.

Figure 7:
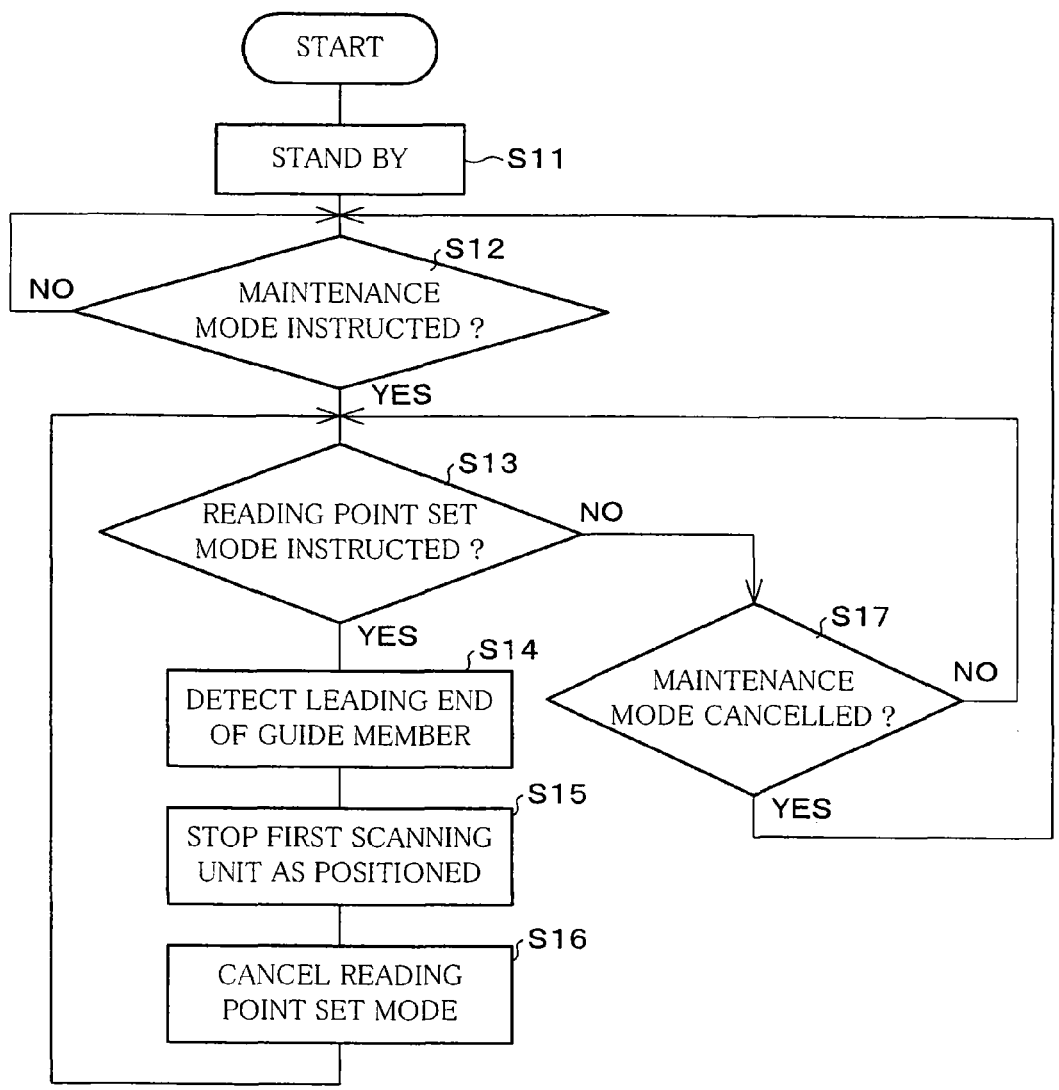
FIG. 7 is a flow chart showing another example of steps for positioning the first scanning unit using the document reading device shown in FIG. 2.

In another example, detecting the position of the guide member 73 and setting Pos3 are carried out in advance at an adjustment stage after the document reading device S is assembled in a factory, and thereafter, the leading end position of the guide member 73 is detected at the time of maintenance and replacement of the upper cabinet 2. A flow in this case is shown in FIG. 7. At the step S11 of a standby state, when a maintenance mode is instructed from the operation section 84 in FIG. 4 at the step S12, whether a Pos3 (reading position) set mode is instructed is determined at the step S13. In the case when the Pos3 set mode is instructed, the process goes to the step S14 for detecting the leading end of the guide member 73. In the case when the Pos3 set mode is not instructed, the process goes to the step S17 and returns to the step S13 unless the maintenance mode is cancelled. When the maintenance mode is cancelled, the process returns to the step S12. After the step S14, the process goes to the step S15 for setting the position of Pos3 to position the first scanning unit 12 at the position of Pos3 and storing data on the position Pos3 in the information memory section 85 shown in FIG. 4. Then, the process goes to the step S16 for canceling a set mode of the position of Pos3 and returns to the step S13.

Such a setting of the position Pos3 in other mode may be carried out in a service mode by a service person if needed. Entrance to the service mode is realized by pressing predetermined keys on the operation section 84 shown in FIG. 4 in a predetermined order.

In still another example, the fact that the upper cabinet 2 has been opened is stored and the leading end position of the guide member 73 is detected after it is opened. The upper cabinet 2 is opened, for example, when a document is set on the first contact glass 11 in the static reading mode. Opening/closing of the upper cabinet 2 can cause a shifted installation position of the guide member 73, resulting in change in the leading end position of the guide member 73. The fact that the upper cabinet 2 has been opened can be stored in accordance with a document size determination by the document size detector 82 (see FIG. 4), which is provided in the lower cabinet 1. The document size determination is carried out just before depression of a document is completed by the upper cabinet 2. At this moment, using signals from a detector (not shown) for detecting the position of the upper cabinet 2, an instruction for document size detection and a history of opening of the upper cabinet 2 are stored in the information memory section 85. This history is erased after the position Pos3 is set and the first scanning unit 12 is caused to move to Pos3.

Figure 8:
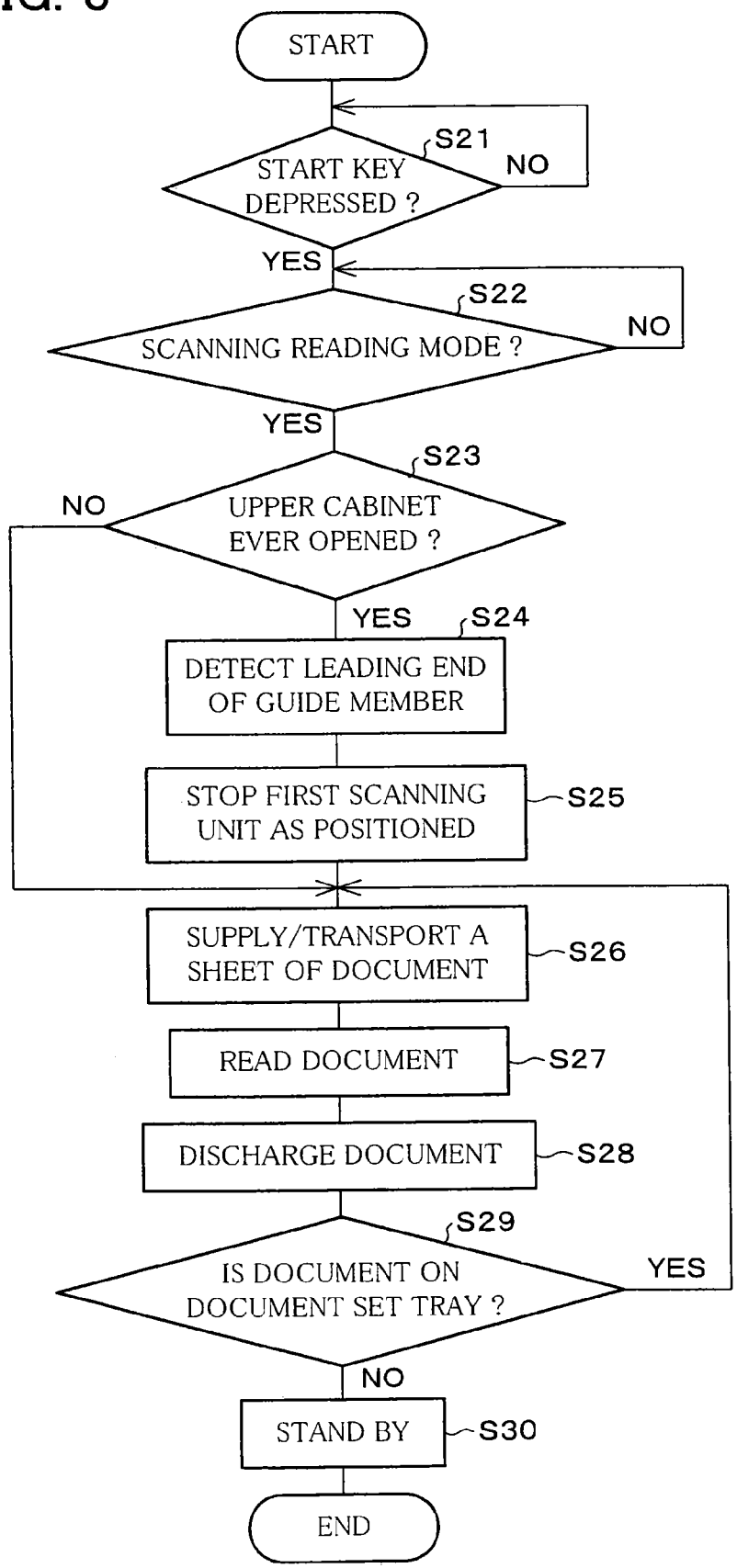
FIG. 8 is a flow chart showing still another example of steps for positioning the first scanning unit using the document reading device shown in FIG. 2.

A flow in this case is shown in FIG. 8. At the step S21, when a start key is depressed, the process goes to the step S22. At the step S22, when a scanning reading mode is instructed, the process goes to the step S23. At the step S23, whether there is a history that the upper cabinet 2 has been opened is determined. If there is the history of opening, the process goes to the step S24 for detecting the leading end position of the guide member 73. At the step S25, the position Pos3 is set and the first scanning unit 12 is caused to position and stop at the position of Pos3. After the step S25 or if there is no history of opening at the step S23, the process goes to the step 26 for supplying and transporting a sheet of document. Then, the document is read at the step S27, and the document is discharged at the step S28. Subsequently, at the step S29, as far as a document is on document set tray 22, the process returns to the step S26. When documents to be read are all read and discharged, the process goes to the step S30 for standby.

Note that, in the case of the scanning reading mode, the leading end position of the guide member 73 may be always detected before document reading starts when a start key is depressed.

Further, as described above, detection of the leading end position of the guide member 73 has the following advantages. In many cases, document reading devices capable of operating both in the static reading mode and the scanning reading mode, like the document reading device S, have document transport means on the side of the upper cabinet 2. In such cases, a slight displacement can occur between the reading position A in the scanning reading mode and a position where a transported document rubs against the second contact glass 16 while opening operations are carried out many times. This deviation causes gradual variations in the position of stains appearing on the contact glass 16. Also, this deviation varies depending on document reading devices. Further, variations in the installation position of the guide member 73 cause various states of contact between a document and the second contact glass 16. This also causes variations in the position of stains appearing on the contact glass 16. Therefore, according to the present embodiment in which the leading end position of the guide member 73 is detected to set the position of Pos3, such a problem of variations in the position of stains can be handled easily.

Further, in the document reading device S having a separated structure of the lower cabinet 1 and the upper cabinet 2, a part on a document passing side with respect to the second contact glass 16 is movable so that a flat-plate face of the second contact glass 16 on the document passing side is open to outside. Therefore, opening the flat-plate face of the second contact glass 16 on the document passing side enables easy cleaning when the stains appear on the flat-plate face. Further, in the case when a document transport jam occurs on the second contact glass 16, it is possible to readily handle the document transport jam.

Especially, in the document reading device S, by moving the upper cabinet 2, the flat-plate face of the second contact glass 16 on the document passing side can be open to outside as described above. Specifically, moving the upper cabinet 2 causes simultaneous movement of the document transport driving section 31, the document transport guiding section 33, and the document discharge section 34 which are provided in the upper cabinet 2 so as to be placed on the document passing side with respect to the second contact glass 16. This keeps some distance from the second contact glass 16, the reading section 10, and the first contact glass 11 which are provided in the lower cabinet 1, causing the surface on the document passing side of the second contact glass 16 and a document setting surface of the first contact glass 11 to be open to outside.

Therefore, in moving the upper cabinet 2, it is possible to clean the flat-plate face of the second contact glass 16 on the document passing side and to handle a document jam on the second contact glass 16.

As described above, the document reading device of the present invention includes:

document transport means for transporting a document;

optical reading means provided with an exposure member for emitting light onto the document, the optical reading means being provided for reading the document image by emitting the light from the exposure member at a stop at a predetermined position while the document is being transported by the document transport means, and guiding the reflected light as received by the exposure member from the document which passes over the reading position set according to the predetermined position, to the following optical system so as to sequentially detect the reflected light; and support means being formed in a flat-plate provided between the exposure member and the reading position, for supporting the document being passed over the reading position, which is being transported by the document transport means, the support means allowing the light and the reflected light to be passed there through, wherein the document transport means includes a transport path forming member which is provided in such a manner that the reading position is sandwiched between the transport path forming member and the support means, the transport path forming member forming a transport path with the support means so as to transport the document which passes over the reading position along a flat-plate face of the support means;

the document transport means includes a guide member which serves as a guide face for guiding the document to the reading position so as to form a predetermined inclination angle with respect to the flat-plate face of the support means; and the predetermined reading position is set within a range of predetermined distance in a transport direction from a position facing the leading end of the guide member, which is known beforehand to be free from stains on the support member caused by a contact with the document.

According to the above invention, the guide member, which serves as a guide face, of the document transport means guides the document to the reading position between the support means and the transport path forming member so as to form a predetermined inclination angle with respect to the flat-plate face of the support means. Further, a predetermined range of distance in a transport direction of the document from the leading end of the guide member is free from the stains on the support means caused by a contact with the document appear. Therefore, unlike the conventional structure, it is not necessary to increase a distance between the support means and the transport path forming member to prevent the support means from being stained.

As a result, it becomes possible to provide a document reading device which can read an image of a document being transported without being affected by stains on support means, with optical reading means at a stop, while the distance between the support means of a document and a transport path forming member in the vicinity of a reading position in a preferable range of 0.5 mm to 1.0 mm.

The document reading device of the present invention having the foregoing structure may be further arranged such that the predetermined position is set to a position predetermined distance apart from a position facing the leading end of the guide member, as detected, and the optical reading means is moved to the predetermined position as detected.

According to the foregoing structure, the predetermined position is set to a position predetermined distance apart from a position facing the leading end of the guide member, as detected, and the optical reading means is moved to the predetermined position as detected. Therefore, despite variations in installation position of the guide member among devices, it is possible to recognize the position free from the stains of the support means for each device. Further, the leading end position of the guide member may be changed even in the same device. However, with the foregoing structure, it is possible to check and confirm the correct position free from the stains of the support means.

The document reading device of the present invention having the foregoing structure may be further arranged such that at a predetermined timing where it is determined that the position of the leading end of the guide member could have changed from a position detected last time, the detection of the position of the leading end of the guide member is carried out, and the predetermined position is set based on the position of the leading end as detected.

According to the foregoing structure, even when the leading end position of the guide member is changed from the position at the last time detection, the leading end position can be detected at a predetermined timing where it is determined that the position of the leading end of the guide member could have changed from a position detected last time. This allows the predetermined position to be set to a correct position in accordance with the leading end position of the guide member when reading the document. Therefore, it is possible to ensure reading at a position from the stains caused by a contact with a document.

The document reading device of the present invention having the foregoing structure may be further arranged such that at least the leading end of the guide member is formed in color readable by the optical reading means can read by carrying out a scanning exposure by the exposure member.

According to the above invention, the optical reading means can read the color of the leading end of the guide member and detect the leading end position of the guide member by carrying out a scanning exposure by the exposure member. Therefore, since the optical reading means can be used to detect the leading end position, it is not necessary to provide additional detection means.

Further, the document reading device of the present invention having the foregoing structure may be further characterized in that the guide member is made of flexible material.

According to the above invention, even when the guide member crushes with a great force to the support means in some action, it is possible to prevent the damage of the support means because the guide member is made of flexible material. In addition, it is possible to reduce transport resistance of a document to the guide member, which, in turn, realizes a smooth transportation of the document.

The document reading device of the present invention having the foregoing structure may be further arranged such that a part of the support means on a document passing side is movable so that a flat-plate face of the support means on the document passing side is open to outside.

According to the above invention, by moving the part on the document passing side with respect to the support means to open the flat-plate face of the support means on the document passing side to outside, it is possible to easily clean when the stains appear on the flat-plate face. Further, in the case when a document transport jam occurs on the support means, it is possible to readily handle the document transport jam.

The document reading device of the present invention having the foregoing structure may be further arranged such that the document transport means is stored in a first cabinet so as to be placed on the document passing side with respect to the support means;

the support means and the optical reading means are stored in a second cabinet, the second cabinet is provided with a document platen for placing thereon a stationary document where the optical reading means read an image of the stationary document by carrying out a scanning exposure by the exposure member, and the first cabinet is movable relative to the second cabinet so that a document placement face of the document platen is open to outside.

According to the above invention, the document reading device includes the document platen for setting a stationary document thereon where the optical reading means read an image of the stationary document by scanning exposure of the exposure member and has an arrangement in which the first cabinet is movable with respect to the second cabinet. Moving the first cabinet causes simultaneous movement of the document transport means which are provided in the first cabinet so as to be placed on the document passing side with respect to the support means. This makes the first cabinet away from the support means, the optical reading means, and the document platen which are included in the second cabinet, causing the surface on the document passing side of the support means and a document setting surface of the document platen to be open to outside.

Therefore, in moving the first cabinet, it is possible to clean the flat-plate face of the support means on the document passing side and to handle a document jam on the support means.

As described above, the document reading device of the present invention is arranged such that the document transport means includes a guide member which serves as a guide face for guiding the document to the reading position so as to form a predetermined inclination angle with respect to the flat-plate face of the support means; and the predetermined reading position is set within a range of predetermined distance in a transport direction from a position facing the leading end of the guide member, which is known beforehand to be free from stains on the support member caused by a contact with the document.

This brings about the effect that it is possible to provide a document reading device which can read an image of a transported document without being affected by stains on the second contact glass 16, in the state where the reading section 10 is stopping, keeping a preferable range of 0.5 mm to 1.0 mm of the distance between the support means of a document and the transport path forming member in the vicinity of the reading position.

The document reading device of the present invention may be further arranged such that the predetermined position is set to a position predetermined distance apart from a position facing the leading end of the guide member, as detected, and the optical reading means is moved to the predetermined position as detected.

This brings about the effect that even when an installation position of the guide member varies depending on devices, it is possible to recognize a position where the support means are not stained for each device, and additionally, even when the leading end position of the guide member changes in one device, it is possible to start again finding a position where the support means are not stained.

The document reading device of the present invention may be further arranged such that at a predetermined timing where it is determined that the position of the leading end of the guide member could have changed from a position detected last time, the detection of the position of the leading end of the guide member is carried out, and the predetermined position is set based on the position of the leading end as detected.

This brings about the effect that it is possible to surely perform a reading operation at a position free from the stains caused by a contact with a document.

Further, the document reading device of the present invention may be further arranged such that at least the leading end of the guide member is formed in color readable by the optical reading means can read by carrying out a scanning exposure by the exposure member.

This brings about the effect that it is not necessary to provide additional detection means since the optical reading means can be used to detect the leading end position.

Further, the document reading device of the present invention, as described above, has an arrangement in which the guide member is made of flexible material.

This brings about the effect that it is possible to prevent the damage of the support means because the guide member is made of flexible material. In addition, this brings about the effect that it is possible to reduce transport resistance of a document to the guide member, enabling smooth transporting of a document.

The document reading device of the present invention having the foregoing structure may be further arranged such that a part of the support means on a document passing side is movable so that a flat-plate face of the support means on the document passing side is open to outside.

This brings about the effect that by moving the part on the document passing side with respect to the support means to open the flat-plate face of the support means on the document passing side to outside, it is possible to easily clean when the stains appear on the flat-plate face. In addition, this brings about in the case when a document transport jam occurs on the support means, it is possible to readily handle the document transport jam.

The document reading device of the present invention may be further arranged such that the document transport means is stored in a first cabinet so as to be placed on the document passing side with respect to the support means;

the support means and the optical reading means are stored in a second cabinet, the second cabinet is provided with a document platen for placing thereon a stationary document where the optical reading means read an image of the stationary document by carrying out a scanning exposure by the exposure member, and the first cabinet is movable relative to the second cabinet so that a document placement face of the document platen is open to outside.

This brings about the effect that in moving the first cabinet, it is possible to clean the flat-plate face of the support means on the document passing side and to handle a document jam on the support means.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A document reading device comprising:
    document transport means for transporting a document;
    optical reading means for reading a document image, said
        optical reading means being provided with a movable exposure member which stops at a predetermined reading position and emits light onto the document;
    support means for supporting the document being transported by the document transport means when the document passes over the reading position;
    a guide member, formed in a predetermined inclination angle with respect to a flat-plate face of the support means, which serves as a guide face for guiding the document to the reading position; and
    a transport path forming member for forming a transport path with the support means so that the document which passes over the reading position can be transported along the flat-plate face of the support means;
    wherein the optical reading means detects a leading end position, in a transport direction, of the guide member, and the predetermined reading position is set within a range of predetermined distance in a transport direction from the leading end position, wherein the predetermined distance is known beforehand to be free from stains on said support member caused by a contact with the document.

2. The document reading device according to claim 1, further comprising:
    a memory section for storing data on an area free from stains based on data on stain appearance frequency of said support means,
    wherein the predetermined reading position is set based on the data stored in the memory section.

3. The document reading device according to claim 1, further comprising:
    an opening detection section for detecting an opening of a cabinet which stores said document transport means
    wherein when the opening detection section detects the opening of the cabinet, said detection means detects the leading end position of the guide member and sets the reading position based on the leading end position.

4. A document reading device comprising:
    document transport means for transporting a document;
    optical reading means provided with an exposure member for emitting light onto the document, said optical reading means being provided for reading the document image by emitting the light from the exposure member at a stop at a predetermined position while the document is being transported by the document transport means, and guiding the reflected light as received by the exposure member from the document which passes over the reading position set according to the predetermined position, to the following optical system so as to sequentially detect the reflected light; and
    support means being formed in a flat-plate provided between the exposure member and the reading position, for supporting the document being passed over the reading position, which is being transported by said document transport means, said support means allowing the light and the reflected light to be passed there through,
    wherein said document transport means includes a transport path forming member which is provided in such a manner that the reading position is sandwiched between said transport path forming member and said support means, said transport path forming member forming a transport path with said support means so as to transport the document which passes over the reading position along a flat-plate face of said support means;
    said document transport means includes a guide member, formed in a predetermined inclination angle with respect to the flat-plate face of the support means, which serves as a guide face for guiding the document to the reading position; and the predetermined reading position is set within a range of predetermined distance from a position facing the leading end of the guide member in a transport direction, wherein the predetermined distance is known beforehand to be free from stains on the support member caused by a contact with the document.

5. The document reading device according to claim 4, wherein:

the predetermined position is set to a position predetermined distance apart from a position facing the leading end of said guide member, as detected, and said optical reading means is moved to the predetermined position as detected.

6. The document reading device according to claim 5, wherein:

at a predetermined timing where it is determined that the position of the leading end of said guide member could have changed from a position detected last time, the detection of the position of the leading end of said guide member is carried out, and the predetermined position is set based on the position of the leading end as detected.

7. The document reading device according to claim 5, wherein:

at least the leading end of the guide member is formed in color readable by said optical reading means can read by carrying out a scanning exposure by said exposure member.

8. The document reading device according to claim 1, wherein:

said guide member is made of a flexible material.

9. The document reading device according to claim 4, wherein:

a part of said support means on a document passing side is movable so that a flat-plate face of said support means on the document passing side is open to outside.

10. The document reading device according to claim 9, wherein:

said document transport means is stored in a first cabinet so as to be placed on the document passing side with respect to said support means;

said support means and said optical reading means are stored in a second cabinet, said second cabinet is provided with a document platen for placing thereon a stationary document where said optical reading means read an image of the stationary document by carrying out a scanning exposure by said exposure member, and said first cabinet is movable relative to said second cabinet so that a document placement face of the document platen is open to outside.

* * * * *